United States Patent [19]

Swansen

[11] Patent Number: 4,642,466
[45] Date of Patent: Feb. 10, 1987

[54] FAST COUNTING ELECTRONICS FOR NEUTRON COINCIDENCE COUNTING

[75] Inventor: James E. Swansen, Los Alamos, N. Mex.

[73] Assignee: The United States of America as represented by the United States Department of Energy, Washington, D.C.

[21] Appl. No.: 708,477

[22] Filed: Mar. 5, 1985

[51] Int. Cl.[4] .............................................. G01T 3/00
[52] U.S. Cl. ..................................... 250/392; 250/390
[58] Field of Search ............... 250/392, 390 B, 390 R, 250/388, 370 C, 370 F

[56] References Cited

U.S. PATENT DOCUMENTS 3,614,437 10/1971 Allemand et al. ................... 376/153
4,035,776 7/1977 Socha et al. ........................ 364/900

FOREIGN PATENT DOCUMENTS 1066433 11/1979 Canada ................................ 250/388

OTHER PUBLICATIONS

H. Tourwé, J. Uyttenhove and R. Van de Vijver, "A Data Sorting and Processing System for Photoneutron Research", *Nuclear Instruments and Methods*, vol. 118, No. 1 (1974) pp. 279–284.

E. J. Dowdy, J. T. Caldwell and G. M. Worth, "A High Efficiency Neutron Detection System for Photoreaction Studies", *Nuclear Instruments and Methods*, vol. 115, No. 2 (1974) pp. 573–579.

*Primary Examiner*—Carolyn E. Fields
*Assistant Examiner*—Constantine Hannaher
*Attorney, Agent, or Firm*—Ray G. Wilson; Judson R. Hightower

[57] ABSTRACT

An amplifier-discriminator is tailored to output a very short pulse upon an above-threshold input from a detector which may be a $^3$He detector. The short pulse output is stretched and energizes a light emitting diode (LED) to provide a visual output of operation and pulse detection. The short pulse is further fed to a digital section for processing and possible ORing with other like generated pulses. Finally, the output (or ORed output) is fed to a derandomizing buffer which converts the rapidly and randomly occurring pulses into synchronized and periodically spaced-apart pulses for the accurate counting thereof. Provision is also made for the internal and external disabling of each individual channel of amplifier-discriminators in an ORed plurality of same.

13 Claims, 4 Drawing Figures

FAST COUNTING ELECTRONICS FOR NEUTRON COINCIDENCE COUNTING

BACKGROUND OF THE INVENTION

The present invention relates generally to the field of analog and digital signal processing counting randomly occurring pulses and more particularly to the field of high speed analog and digital signal processing for neutron coincidence counting. This invention is the result of a contract with the Department of Energy (Contract No. W-7405-ENG-36).

A high speed analog detector with digital output is essential in the field of neutron time-correlation measurement for nuclear materials and for other applications wherein a plurality of rapidly and randomly occurring pulses are to be detected and counted with assured accuracy. Neutron correlation, or coincidence, counting is commonly used in both active and passive nondestructive assay (NDA) instrumentation as a unique signature of the fission process. Thermal-neutron counting systems utilizing polyethylene moderators and $^3$He or $BF_3$ gas-filled proportional counters have been limited in counting rate capability by the charge-collection time and the applification circuitry. This has resulted, in many cases, in large counting losses for materials with high nuclear material content and, in some cases, unreliable assays because of excessive counting rates.

Prior art neutron time-correlation, or coincidence, counting circuits used extensively during the past decade for nuclear material measurements and safeguards are detailed by J. S. Swansen, P. R. Collinsworth, and M. S. Krick in "Shift-Register Coincidence Electronics System for Neutron Counters," Los Alamos National Laboratory Report LA-8319-MS, April 1980. The prior art systems described are limited in counting speed and accuracy due in part to coincidence dead times in the order of 2.4 microseconds. An improvement to counting rates of over 150 kilo-pulses per second/channel and 1 million pulses per second total for six channels with a deadtime of only about 0.7 microseconds as achieved by the present invention represents a significant advancement in the state of the art.

It is therefore an object of the present invention to provide a high-performance neutron time-correlation counter having improved counting rate, accuracy and stability.

It is another object of the present invention to provide a plurality of improved detectors that can function in conjunction with each other, each having separate visual output of pulse detection and each being either enabled or disabled without affecting the operation of the others.

SUMMARY OF THE INVENTION

To achieve the foregoing and other objects, and in accordance with the purposes of the present invention, as embodied and broadly described herein, the apparatus of this invention may comprise a high speed amplifier-discriminator fed by at least one detector which may be a $^3$He detector. The amplifier-discriminator is tailored to output a very short pulse upon an above-threshold input from the detector. The short pulse output is stetched and energizes a light emitting diode (LED) to provide a visual output of operation and pulse detection. The short pulse is further fed to a digital section for processing and possible ORing with other like generated pulses. Finally, the output (or ORed output) is fed to a derandomizing buffer which converts the rapidly and randomly occurring pulses into synchronized and periodically spaced-apart pulses for the accurate counting thereof. Provision is also made for the internal and external disabling of each individual channel of amplifier-discriminators in an ORed plurality of same.

An advantage of the present invention is that high-speed pulse detection accuracy and counting stability is achieved.

Another advantage is that a plurality of pulse detection channels may be ORed together while each channel provides a visual output of its operation and may be independently disabled.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated to and form a part of the specification, illustrate the embodiment of the present invention and, together with the description, serve to explain the principles of the invention. In the drawings.

DETAILED DESCRIPTION OF THE PREFERRED EMBODIMENT

The present invention relates to an apparatus amplifying pulses generated from a plurality of detectors and providing an accurate count thereof. The following will detail in order, the analog portion of the amplifier associated with each detector, the digital portion of the amplifier, the daisy chain OR logic circuit for combining the outputs of the amplifiers and the derandomizing buffer logic used to convert the outputs of the amplifiers into shaped, spaced-apart, the synchronized pulses for the accurate counting thereof.

Figure 1:
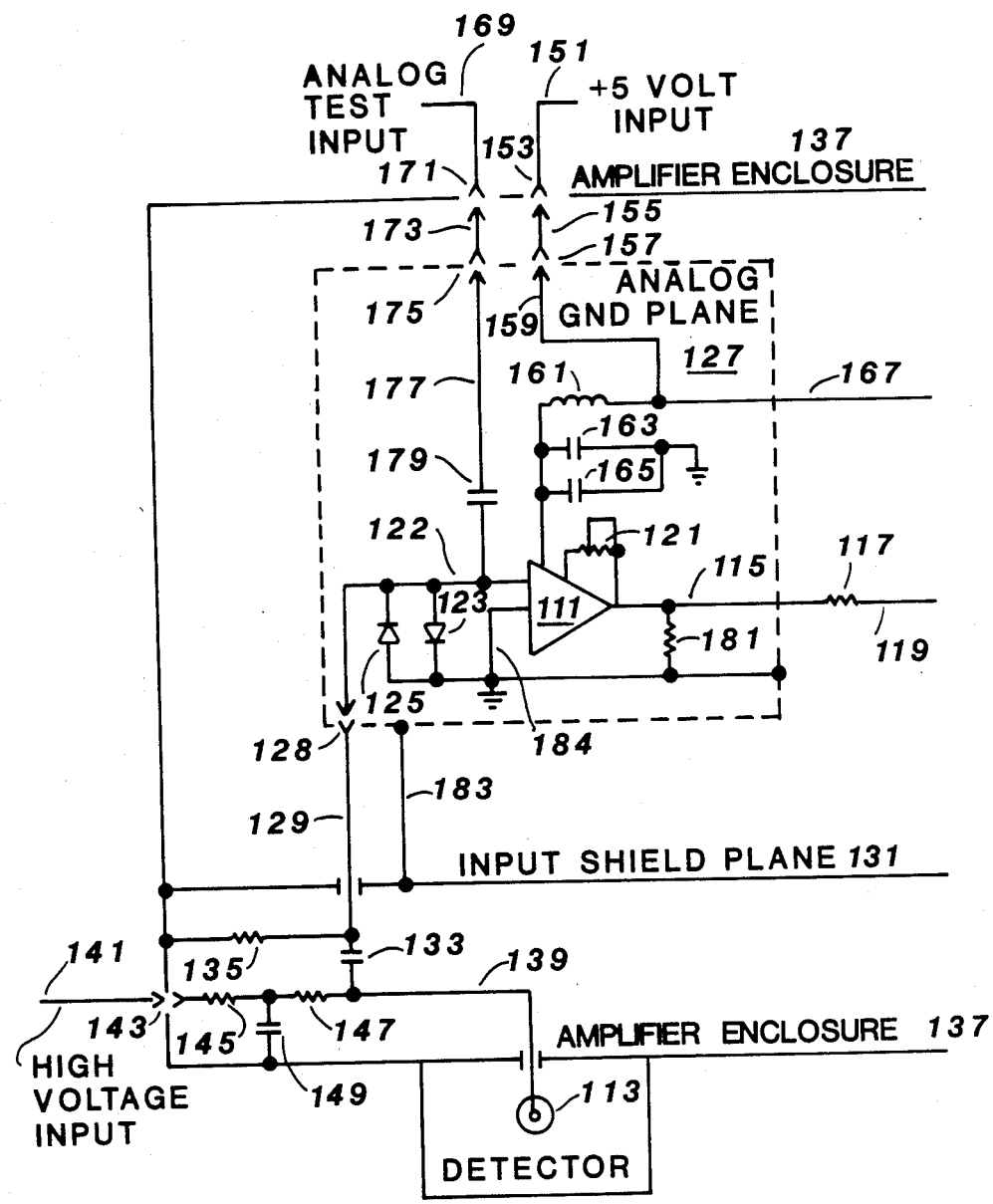
FIG. 1 is a schematic of the analog portion of an amplifier of the present invention.

Analog processing in the present invention may be best understood with reference to FIG. 1. An amplifier 111 is used to process a signal received from detector 113 and provide an output on line 115 through resistor 117 to analog output line 119. The amplifier 111 is preferably a type A-111 hybrid charge sensitive preamplifier-discriminator available from AMPTEK, Inc. or its equivalent. Preferably it has a nominal threshold referenced to its input of $8 \times 10^{-15}$ coulomb which is equivalent to $5 \times 10^4$ electrons. The threshold can be increased by a factor of about x10 by decreasing the resistance across threshold adjust potentiometer 121. When the input threshold is exceeded, a positive output pulse is provided on output line 115 capable of interfacing directly with CMOS and other logic having a risetime of approximately 25 ns, a width of approximately 260 ns and an amplitude of approximately 4.7 volts.

The input to the amplifier 111 on input line 122 is protected by back-to-back diodes 125 and 123 which may be of type 1N3731 or 1N4154. To provide high sensitivity with good noise rejection the amplifier 111 and other components as shown in FIG. 1 are shielded by an anlog ground plane 127. The input 122 connects through connector 128 to line 129 which feeds through another shield, the input shield plane 131 to capacitor 133 and grounded resistor 135. All of the above are enclosed and further shielded by the amplifier enclosure 137.

Capacitor 133 is fed by the output line 139 of detector 113. The detector 113 generates a plurality of pulses, often in bursts, thereby requiring the sophisticated amplifying and signal processing techniques and apparatus of the present invention to achieve an accurate count of the number of detected pulses. This is particularly so when, as is normally done, a plurality of detectors 113 are used in parallel. In the preferred embodiment of the invention the detectors 113 are $^3$He proportional detectors. High voltage is supplied to the detector 113 on high voltage line 141 through connector 143 and resistors 145 and 147 to line 139. Between resistors 145 and 147, a capacitor 149 grounded to the amplifier enclosure 137 is provided.

Voltage is supplied to amplifier 111 on line 151 through connector 153, line 155, connector 157, line 159 and inductor 161. The supplied voltage, preferably ≡volts, is by-passed to ground by capacitors 163 and 165 and provided to following circuits on line 167.

An analog test input is provided on line 169 through connector 171, line 173, connector 175, line 177 and capacitor 179 to input line 121. The output of amplifier 111 is pulled down by load resistor 181. Further grounding and shielding protection is provided by electrically connecting the analog ground plane 127 to the input shield plane 131 by metal standoff 183. If amplifier 111 has a second or differential input 184, it too is grounded.

Figure 2:
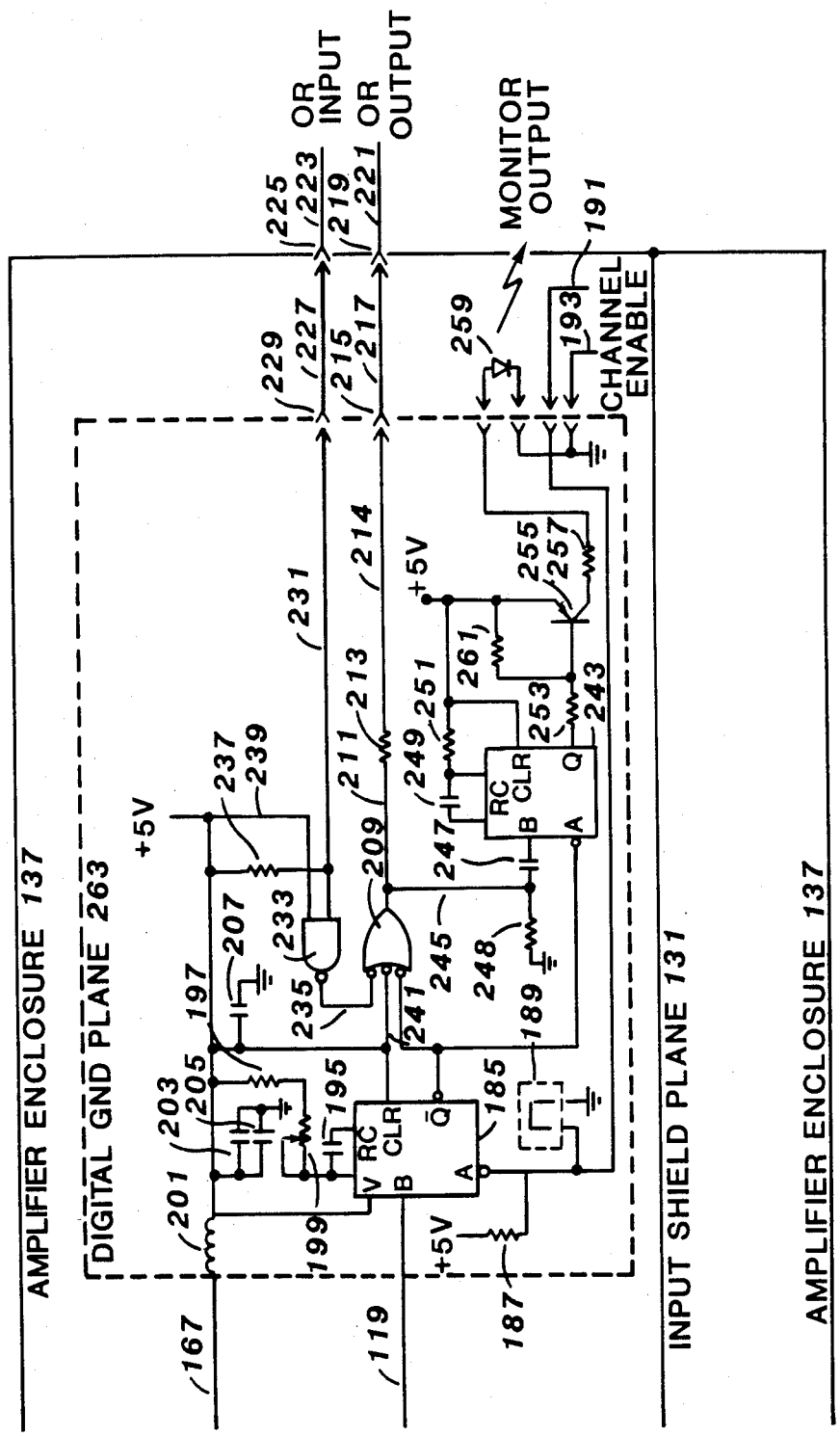
FIG. 2 is a schematic of the digital portion of an amplifier of the present invention.

The output of the amplifier 111 on line 119 drives the B input of a monostable multivibrator circuit 185 used to receive the pulse on line 119 which is nominally $\frac{1}{2}\mu$ second and generate therefrom a 50 nanosecond pulse, see FIG. 2. The circuit 185 has an inverted a input which is nominally held at +5 volts through resistor 187 but may be grounded by jumper plug 189 or externally by connecting channel enable wires 191 and 193. The time constant of the circuit 185 is set by capacitor 195, resistor 197 and potentiometer 199. Supply voltage is fed to the circuit 185 on line 167 through inductor 201 with by-passing provided by capacitors 203, 205, and 207. The CLR input of circuit 185 is secured to the supply voltage.

The $\overline{Q}$ output pulse of 50 nanoseconds is provided to inverted-input OR gate 209 which feeds an output on line 211 through series terminating resistor 213, line 214, connector 215, line 217, and connector 219 to OR output line 221. The OR input line 223 is fed through connector 225, line 227, connector 229 and line 231 to NAND gate 223 used as an invertor whose output on line 235 also inputs inverted-input OR gate 209. The line 231 is biased towards the supply voltage through resistor 237. Other inputs to NAND gate 233 are tied to the supply voltage by line 239. Likewise another input to OR gate 209 is connected to the supply voltage and the CLR input of circuit 185 by line 241.

In order to provide a visible indication of the presence of a pulse on line 211 a pulse stretching circuit 243 is provided. The B input thereof is provided from inverted-input OR gate 209 through line 245 and capacitor 247. The line 245 is biased towards ground through resistor 248. The A input of circuit 243 is provided by the $\overline{Q}$ output of circuit 185. Timing for circuit 243 is determined by capacitor 249 and resistor 251. Preferably an output pulse of several milliseconds is provided through base resistor 253 to transistor 255 which drives through collector resistor 257 a light emitting diode 259 which provides a visual indication of a pulse. The transistor 255 is also provided with emitter-to-base resistor 261. The above circuits are provided shielding and grounding by the digital ground plane 263.

Figure 3:
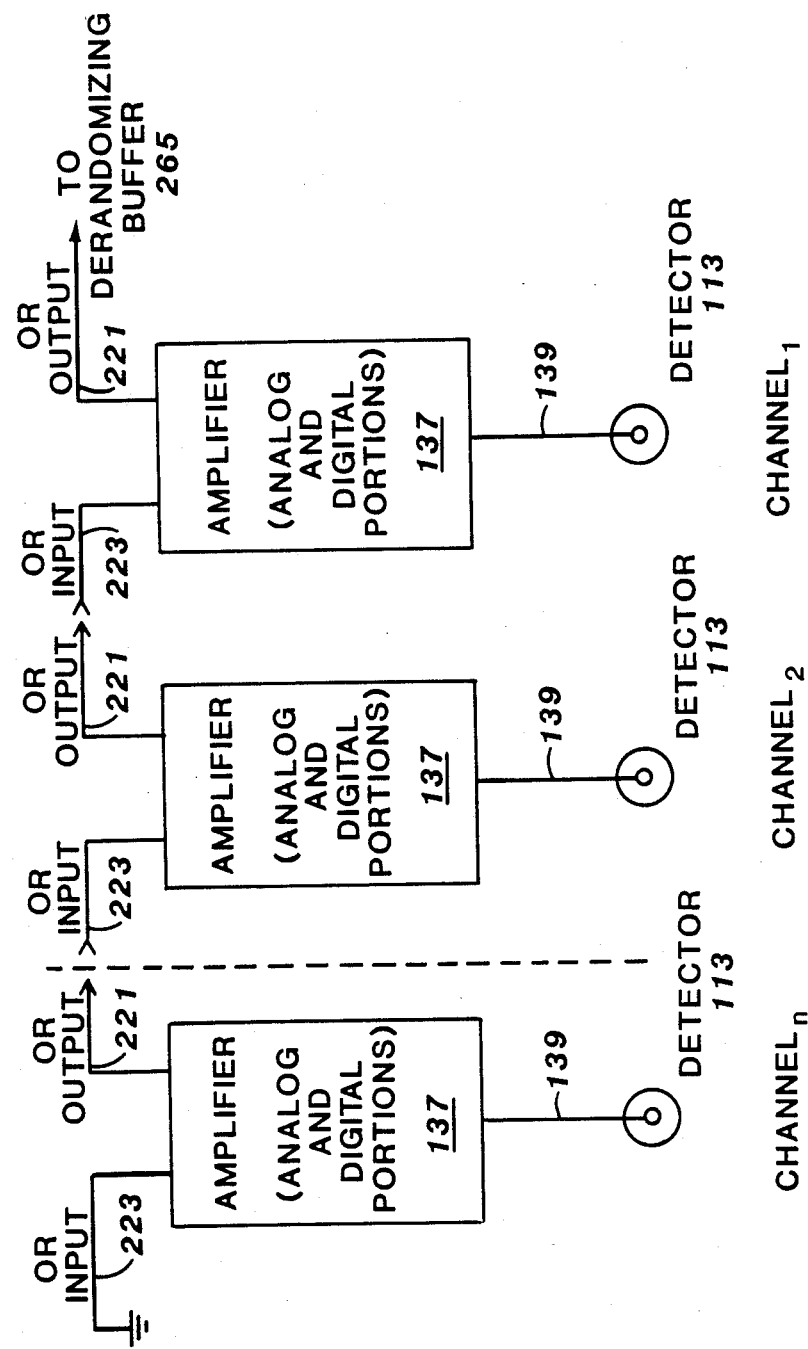
FIG. 3 is a logic diagram of a daisy chain OR circuit used in the present invention to combine the outputs of a plurality of amplifiers.

With reference to FIG. 3 it can be seen how a plurality of units, above described, may be daisy chained together. Each channel, from channel 1 through channel n, includes at least one detector 113 connected to the circuits within the amplifier enclosure 137 by line 139 as shown in FIG. 1. As shown in FIG. 2 the amplifier enclosure 137 provides an OR input line 223 and an OR output line 221. These lines are chained together as shown in FIG. 3 with the OR input line of channel n grounded and the OR output line of channel 1 providing the input to a derandomizing buffer 265 to be described.

Figure 4:
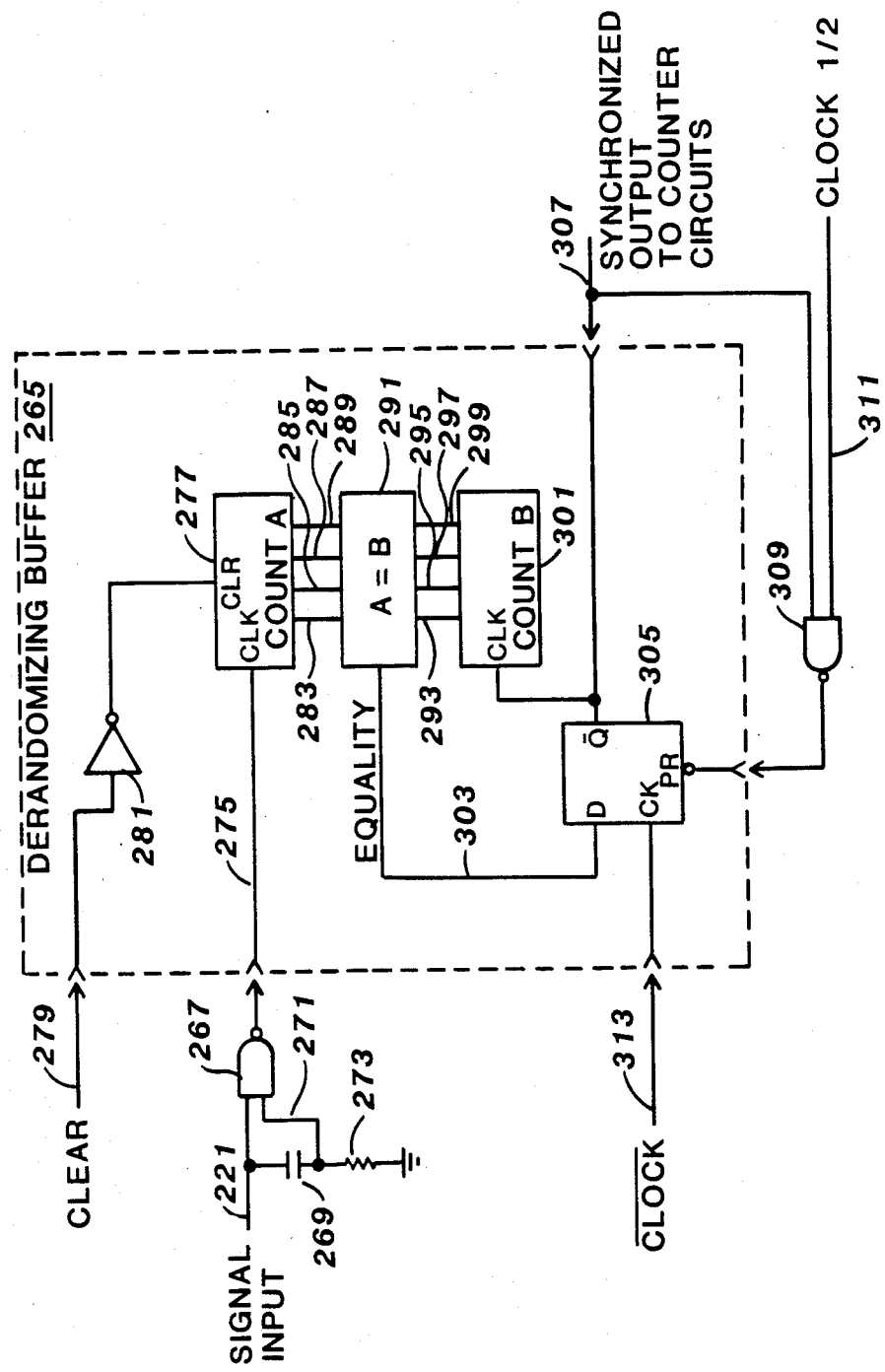
FIG. 4 is a logic diagram of a derandomizing buffer used in the present invention to convert the outputs of the amplifiers of the present invention into shaped, spaced-apart, and synchronized pulses for the accurate counting thereof.

Since pulses may be plentiful and occur randomly, a derandomizing buffer 265 is provided to generate a chain of synchronized. spaced-apart pulses which may be counted accurately, see FIG. 4. The OR output 221 provides 50 nanosecond pulses occurring randomly as an input to NAND gate 267. A capacitor 269 is connected to the line 221 to provide a second input 271 of NAND gate 267 which is also grounded through resistor 273. The capacitor 269, resistor 273 and NAND gate 267 provide a suitable pulse on line 275 to drive the clock input CLK of a first counter 277. A clear signal provided on line 279 through inverter 281 (if need be) clears the counter 277. This clear signal also clears subsequent counting circuits (not shown). The counter provides a parallel digital output shown on lines 283, 285, 287 and 289. Since four lines are shown a count of 16 is provided. A larger counter 277 may be used to permit a closer approach to the clock rate without counting loss. The size of the counter 277 is a trade-off design consideration based on the maximum expected pulse rate and the clock frequency.

The binary count on lines 283, 285, 287 and 289 are provided to a binary comparator 291. The binary comparator 291 also receives a binary count on lines 293, 295, 297 and 299 from second counter 301. When the count of counter 301 equals the count of counter 277 an equality output is provided on line 303 to disable the D input of flip-flop 305. An inverted clock signal is provided on line 313 to drive the CLK input of flip-flop 305. Synchronization is provided when the $\overline{Q}$ of flip-flop 305 is set by the CLOCK signal provided the D input is enabled. $\overline{Q}$ of flip-flop 305 is reset by having the output 307 provide one input to NAND gate 309 while a CLOCK $\frac{1}{2}$ signal provides the second input on line 311. The CLOCK $\frac{1}{2}$ signal is synchronized with the CLOCK signal but is positive only for the last $\frac{1}{2}$ of the positive portion of the clock signal. The output of NAND gate 309 drives the PR (preset) input of flip-flop 305. The $\bar{Q}$ output of flip-flop 305 feeds the CLK input of counter 301 and provides a derandomized, synchronized pulse output on line 307 to provide a reliable input to further pulse counting circuits (not shown).

In the preferred embodiment above described, certain specific components may be employed. For example, the detectors 113 may be Reuter-Stokes RS-P4-0820-103 detectors, monostable multivibrators 185 and 243 may be implemented with a 74LS221, counters 277 and 301 with a 74LS393, binary comparator 291 with a 74S85, and flip-flop 305 with a 74LS74.

The foregoing description of the preferred embodiment of the invention has been presented for purposes of illustration and description. It is not intended to be exhaustive or to limit the invention to the precise form disclosed, and obviously many modifications and variations are possible in light of the above teaching. For example, the ORing shown in FIG. 3 need be accomplished external to individual amplifier enclosures 137 for a plurality of the analog and digital circuits shown in FIGS. 1 and 2 may be enclosed and ORed together in a single amplifier enclosure 137. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A high speed circuit for accurate neutron coincidence counting comprising:
   neutron detecting means for providing an above-threshold signal upon neutron detection;
   amplifying means inputted by said neutron detecting means for providing a pulse output having a pulse width of about 0.5 microseconds upon the input of each above-threshold signal;
   digital processing means inputted by said pulse output of said amplifying means for generating a pulse responsive to each input pulse from said amplifying means and having a pulse width of about 50 nanoseconds effective for processing an expected neutron event rate of about 1 Mpps:
   pulse stretching means inputted by said digital processing means for producing a pulse having a pulse width of several milliseconds for each pulse received from said digital processing means;
   visual indicating means inputted by said pulse stretching means for producing a visual output for each pulse received from said digital processing means;
   derandomizing means effective to receive said 50 ns neutron event pulses from said digital processing means for storage at a rate up to said neutron event rate of 1 Mpps and having first counter means for storing said input neutron event pulses, clock means for generating internal pulses in a regular spaced apart fashion while said first counter is storing said input event pulses and at a rate at least equal to an average expected neutron event rate, synchronizing counter means and event counter means for counting said clock pulses, and comparison means for blocking said clock pulses to said synchronizing and event counters when said comparison means determines said first and synchronizing counter contents are equal, said event counter means having a countinuous output indicative of a total number of said neutron events.

2. The high speed circuit for accurate neutron coincidence counting of claim 1 wherein said neutron detecting means including a plurality of $^3$He gas-filled proportional neutron detectors.

3. The high speed circuit for accurate neutron coincidence counting of claim 2 wherein said amplifying means includes a hybrid charge sensitive preamplifier discriminator having an input threshold of $8 \times 10^{-15}$ coulomb.

4. The high speed circuit for accurate neutron coincidence counting of claim 3 wherein said digital processing means and said pulse stretching means each include a monostable multivibrator.

5. The high speed circuit for accurate neutron coincidence counting of claim 4 wherein said visual indicating means includes a light emitting diode.

6. The high speed circuit for accurate neutron coincidence counting of claim 1, further including:
   a shielded enclosure adjacent said neutron detecting means and including an input shield plane for shielding and mounting said amplifying means and said digital processing means adjacent said detector;
   an analog ground plane for isolatingly mounting said amplifying means within said shielded enclosure; and
   a digital ground plane for isolatingly mounting said digital processing means within said shielded enclosure.

7. A high speed accurate neutron coincidence counting system comprising:
   a plurality of neutron detecting means for providing an above-threshold signal upon neutron detection;
   a plurality of amplifying means, one amplifying means individually associated with each said neutron means, each amplifying means inputted by its individually associated said neutron detecting means for providing a pulse output having a pulse width of about 0.5 microseconds upon the input of each above-threshold signal;
   a plurality of digital processing means, one digital processing means individually associated with each said amplifying means, each digital processing means inputted by said pulse output of its individually associated said amplifying means for generating a pulse responsive to each input pulse from said associated amplifying means and having a pulse width of about 50 nanoseconds effective for processing an expected neutron event rate of about 1 Mpps:
   a plurality of pulse stretching means, one pulse stretching means individually associated with each said digital processing means, each said pulse stretching means inputted by its individually associated said digital processing means for producing an activating pulse having a pulse width of several milliseconds for each pulse received;
   a plurality of visual indicating means, one visual indicating means individually associated with each said pulse stretching means, each said visual indicating means inputted by its individually associated said pulse stretching means for producing a visual output for each said activating pulse received;
   ORing means following said plurality of digital processing means for ORing together said pulses generated by more than one digital processing means in said plurality thereof and for providing an output of pulses received; and derandomizing means effective to receive said 50 ns neutron event pulses from said ORing means output for storage at a rate up to said neutron event rate of 1 Mpps and having first counter means for storing said input neutron event pulses, clock means for generating internal pulses in a regular spaced apart fashion while said first counter is storing said input event pulses and at a rate at least equal to an average expected neutron event rate, synchronizing counter means and event counter means for counting said clock pulses, and comparison means for blocking said clock pulses to said synchronizing and event counters when said comparison means determines said first and synchronizing counter contents are equal, said event counter means having a continuous output indicative of a total number of said neutron events.

8. The high speed accurate neutron coincidence counting system of claim 7 wherein said ORing means includes a plurality of ORing circuits, one ORing circuit for each digital processing means, and means for daisy chaining together at least two said ORing circuits.

9. The high speed accurate neutron coincidence counting system of claim 8 wherein each neutron detecting means in said plurality of thereof includes a plurality of $^3$He gas-filled proportional neutron detectors.

10. The high speed accurate neutron coincidence counting system of claim 9 wherein each amplifying means in said plurality thereof includes a hybrid charge sensitive preamplifier discriminator having an input threshold of $8 \times 10^{-15}$ coulomb.

11. The high speed accurate neutron coincidence counting system of claim 10 wherein each digital processing means and each pulse stretching means in said pluralities thereof each include a monostable multivibrator.

12. The high speed accurate neutron coincidence counting system of claim 11 wherein each visual indicating means in said plurality thereof includes a light emitting diode.

13. The high speed accurate neutron coincidence counting system of claim 7, further including a shielded enclosure adjacent said neutron detecting means and including an input shield plane for shielding and mounting said amplifying means and said digital processing means adjacent said detector;

an analog ground plane for isolatingly mounting said amplifying means within said shielded enclosure; and a digital ground plane for isolatingly mounting said digital processing means within said shielded enclosure.

* * * * *